United States Patent Office 3,435,842
Patented Apr. 1, 1969

3,435,842
APPARATUS FOR INSTALLING A VALVE
SEAT IN A VALVE
Susumu Ogawa, Toyonaka, Japan, assignor to Fuji Metal
Manufacturing Co., Ltd., Osaka, Japan
Filed Mar. 30, 1966, Ser. No. 538,857
Claims priority, application Japan, June 7, 1965,
40/33,951
Int. Cl. F16k 1/46, 1/42, 1/48
U.S. Cl. 137—454.6                                     8 Claims

ABSTRACT OF THE DISCLOSURE

This invention is concerned with easily installable and removable valve seats for use in association with valve bodies having an annular valve port recessed therein between inlet and outlet openings. An internally threaded valve guide member for supporting the valve via a threaded valve rod, has its lower portion, as normally disposed within the interior of the valve body, provided with a recess in its periphery. A replaceable valve seat for cooperation with the valve port is disposed between the lower end of the rod-supported valve and the annular port. The valve seat is also provided with a recessed periphery similar to that of the lower portion of the valve guide. A connecting fixture includes interconnected but spaced apart upper and lower resilient ring-like members for engaging the respective peripheral recesses of the valve guide and the valve seat to removably attach the valve seat thereto and to provide positive coaction between the valve seat and the periphery of the interior valve port.

---

The present invention relates to a valve seat for use in a valve that is constructed to be easily attached and detached; that is, it relates to a device which will facilitate the installation in association with an annular valve port, an annular valve seat made up on a different body material, and including resilient expansion means connecting and interposed between said valve seat and a lower portion of valve body to be attached, whereby said valve seat is pressed against the periphery of the valve port by inherent resiliency of the expansible connecting means.

Since the valve seat and its associated valve casing are provided as two separate bodies according to the present invention, an obvious advantage is that it is capable of being utilized to renew old ones by removing the worn valve seat only and replacing it, instead of completely replacing a valve casing or a valve body when wear of the valve seat occurs. The exchange of said valve seat is particularly easily accomplished, the connection between the valve seat and the valve port is a positive one because the valve seat is pressed against the periphery of the associated valve port by a suitable resilient force, thereby precluding leakage.

Figure 1:
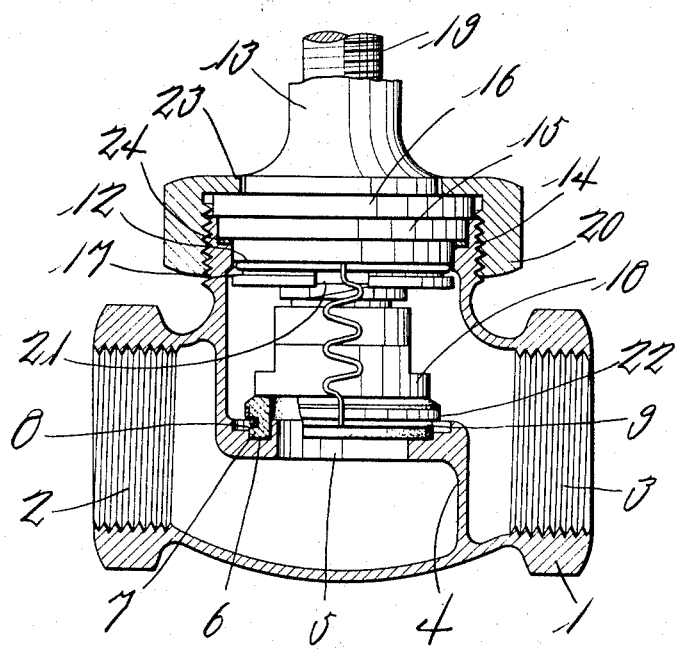
Figure 2:
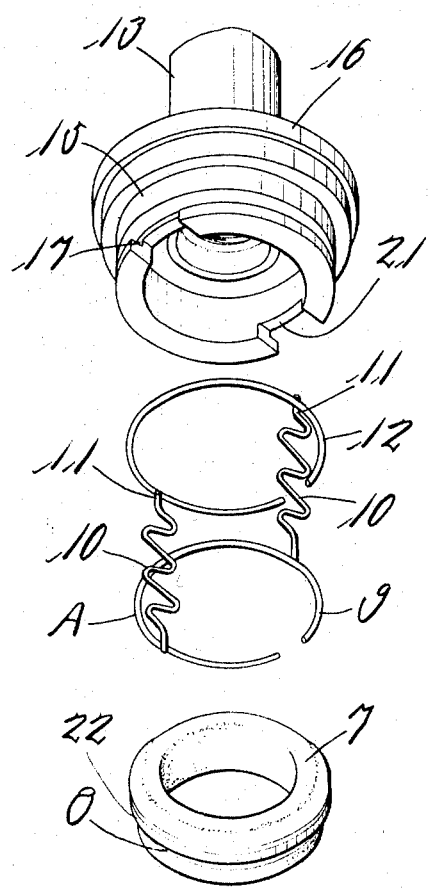

Next, illustrating with accompanying drawings, FIGURE 1 is a longitudinal sectional front view of a main valve portion of an embodiment according to the present invention, the upper portion of a valve rod being not written. FIGURE 2 is a disconnected perspective view of the main part of the apparatus concerning the present invention.

Now, in the figures 1 is a valve casing, in which a charge or inlet opening 2 for fluid is provided on the left hand thereof and a drain or outlet opening 3 for fluid on the right hand thereof, and both openings are internally threaded for receiving complementally threaded male connecting pipes. In the valve casing 1, an intermediate bulkhead 4 is formed integrally with the valve casing, said bulkhead partitions the inner portion of the valve casing 1 into the charge opening half 2 and the drain opening half 3 by fabricating it in a manner whereby the left hand of the bulkhead turns upwards to allow it to make as one body with the upper side of the valve casing and the hight hand of the bulkhead turns downwards to allow it to make as one body with the lower side of the valve casing, and a circular valve port 5 is provided at the central flat portion of said bulkhead 4. A circular annular concave or recessed groove 6 is formed adjacent the valve port 5 in the upper face of said bulkhead 4 and a complementally formed annular valve seat 7 is fitted into said concave groove to be freely attached and detached therefrom.

Said valve seat 7 is made from a synthetic resin such as Teflon. In the outer peripheral face of said valve seat 7 a concave groove 8 is provided along the whole circumferential surface, and along the outer periphery of the valve seat 7 upwardly adjacent of said concave groove 8 a metallic ring 22 is rigidly attached.

In said concave groove 8 a lower holding ring or ring-like member 9 made up of an annular metallic resilient wire, said ring is interrupted at one part and possesses elasticity or resiliency toward an inner direction, is fitted into the concave groove 8 to be freely attached and detached, and the lower ends of a pair of connecting links 11 made of a metallic resilient wire having an expansion and contraction portion 10 bent in zigzag shape toward both outer peripheral sides of said holding ring 9 is secured by means such as a welding etc.

Also, upper ends of said connecting links 11, 11 are secured by suitable means such as a welding, etc., to both outer peripheral sides of the upper holding ring 12 made up of an annular resilient wire which is interrupted at one part and possesses elasticity or resiliency toward an inner direction, and said holding rings 9, 12 and the connecting links 11,11 constitute a fixture A.

A guide cylinder 13 for the valve rod 19 is connected to the upper portion of the valve casing 1 and to enable it to be freely attached and detached, there is provided a bottom portion 15 having a large diameter at the lower end of said guide cylinder fitted into a recess formed within the cylindrical threaded portion 14 located at the central upper portion of the valve casing 1. Additionally, a flange 16 formed at the upper portion of the outer periphery of said bottom portion 15 is adapted to seat on the upper end of the cylindrical threaded portion 14. The guide cylinder 13 is attached to the valve casing 1 by pressing the flange 16 with an inwardly projected edge 23 formed at the upper portion of the inner periphery of a nut 20 screwed to the male threaded portion of said cylindrical portion 14, and a packing 24 is put between said guide cylinder 13 and the cylindrical threaded portion 14.

The lower end of said guide cylinder 13 which projects into the valve casing 1 is provided with a concave groove 17 formed along the whole outer periphery of said guide cylinder, and within which groove 17 the holding ring 12 of the upper portion of said fixture A is adapted to be removably seated.

Also, in diametrically opposite sides of the lower face of the bottom portion 15 at the lower end of said guide cylinder 13 a pair of notches 21, 21 are provided and which extend to or reach the concave groove 17, thereby providing recesses to accommodate the upper ends of the connecting links 11, 11 of fixture A.

A valve rod 19 is provided with a male screw at the outer side thereof, said valve rod is screwed into a female thread inside the guide cylinder 13, the lower end of the valve rod 19 projecting into the valve casing 1, and having the valve body 18 attached at the lower end of the valve rod 19 for cooperative engagement against the valve seat 7.

A handle, omitted in figures, is installed at the upper end of the valve rod 19, with said handle the valve rod 19 being moved vertically by rotating the valve rod 19, and the valve port 5 is opened by the retracting of the valve body 18 from the upper portion of the valve seat 7, or conversely, the valve port 5 is shut by pressing the valve body 18 onto the valve seat 7.

The connecting links 11, 11 are advantageously arranged along both side walls of the valve casing 1 so as not to interrupt flow of fluid, and a projection and a notch for engaging themselves relative to one another are formed in the flange 16 and one part of the cylindrical threaded portion 14 against said flange 16, and by engaging them the notches 21, 21 in the lower end of the bottom portion are automatically faced toward both opposite sides of the valve casing 1.

The connecting link 11 need not be in the form of a wire bent in zigzag as shown in the drawings, but a band of resilient material imparting a spring-like force responsive to arcuate bending thereof may be used. And the lower end of the connecting link 11 is located along the outer periphery of the valve seat 7 and since the lower ends of the connecting links 11, 11 are set outside of the holding ring 9 and along the outer periphery of the valve seat 7 slightly further out than that of the hold ring 9 when recessed in the concave groove 8, it is unnecessary to form a notch for coupling the connecting links 11, 11 outside the valve seat 7, however it would be necessary to provide a notch for fitting the lower end of the connecting links 11, 11 at the outer periphery of the valve seat 7 in case of attaching the lower ends of the connecting links 11, 11 to the upper side of the hold ring 9.

The present invention, by means of the construction mentioned above, enables the valve rod guide cylinder 13 to be removed from the valve casing together with the valve rod 19 and the valve body 18 when the nut 20 is unthreaded from the cylindrical threaded portion 14, and the fixture A and attached valve seat 7 are simultaneously removed therewith.

It is apparent that by opening the holding rings 9, 12 against their elastic force and by disconnecting them from the respective concave grooves 8, 17, the fixture A is readily detachable from lower portion 15 and the valve seat 7 can be readily detached as shown in FIGURE 2, providing a further advantage of readily replacing a worn valve seat.

Also, assembly of the valve seat 7 within the valve casing 1 is facilitated by reconnecting the fixture A, a new valve seat 7 and the bottom portion 15, of the guide cylinder 13. Accordingly, replacement of valve seat 7 is exceedingly easily and precisely accomplished deeply within the threaded portion 14. Furthermore, in assembling as shown in FIGURE 1 since the valve seat 7 is resiliently gripped within the concave groove 6, there is no risk that unstableness due to vibration and the like of the valve seat 7 will occur as fluid flows responsive to the valve body 18 and opening the valve port 5.

In fabricating the valve seat 7 while either a metal or a synthetic resin such as Teflon may be used, the use of a synthetic resin provides an advantage of making the valve seat having an exact shape with close tolerances by means of a mold, with excellent sealing qualities. But even in using metallic valve seat, there is no doubt that a perfectly closed effect is obtainable if a contact surface is finished smooth.

If the valve seat 7 is made up from comparatively soft rubber or synthetic resin, capable or being used as a packing, the part of the valve seat closely adjacent to the concave groove 6 and the valve seat of the valve body may not be so precisely finished.

Moreover, if a packing is put between the valve seat 7 and the concave groove 6 in using a metal for the valve seat 7, only the contact surface between the valve seat 7 and the valve body 8 need be precisely finished. Also, instead of the concave groove 6, an annular peripheral wall may be formed at the outer periphery of the upper portion of the valve port 5 and the valve seat 7 may be fitted to the outer side of said wall, and also a concave stepped portion having a larger diameter than that of the valve port may be provided to the upper portion of the valve port 5 and the valve seat 7 may be fitted to said stepped portion. In conclusion the valve seat 7 may thereby be provided so as not to move laterally by holding the valve seat to the valve port 5 in a concentric state.

What I claim is:

1. In a valve construction which includes a valve guide through which a threaded valve rod having a valve on the inner end thereof enable the valve to move to and from its seat in generally parallel planes, and wherein the valve body is provided with oppositely disposed inlet and outlet openings, and an intermediate interior wall having an annular port transverse to said inlet and outlet openings to receive the valve seat, the improvement of valve apparatus to facilitate initial installation and replacement of an annular valve seat in cooperation with the interior valve port comprising in combination:

(a) a valve body or casing with means for removably attaching the valve guide, said valve guide having a lower end disposed within said valve body above and parallel to said interior port and provided with a relatively shallow peripheral recess therein;

(b) a separate annular valve seat removably interposed between the end of the valve on the valve rod and said valve port, said valve seat being of deformable material and provided also with a relatively shallow annular recess in its outer radial periphery;

(c) a fixture to facilitate the positioning of the valve seat adjacent the lower end of the valve and to removably attach it to and in spaced relation from the lower end of the valve guide; said fixture comprising a pair of resilient compression ring-like holding members disposed in parallel spaced relation and rigidly interconnected at substantially opposite sides by resilient connecting links; and (d) said ring-like holding members of the fixture being readily disposed within the respective annular recesses on said valve guide and said valve seat, to position said valve seat in a predetermined manner.

2. The improved valve apparatus as defined in claim 1, wherein the ring-like holding members each have an interrupted or non-continuous segment intermediate the points of connection of the connecting links; and said holding members and the connecting links are fabricated of the same resilient spring-like material.

3. The improved valve apparatus as defined in claim 1, wherein the interior wall within which the interior annular port is provided, is provided with complementally formed annular means with which the annular valve seat in the area of its annular recess coacts therewith to preclude lateral displacement of the valve seat, said valve seat being of a slightly deformable material and said ring-like holding member exerting its compression force radially inward to assure a positive seal therewith.

4. The improved valve apparatus as defined in claim 1, wherein the connecting links each include a zigzag intermediate portion.

5. The improved valve apparatus as defined in claim 1, wherein the lower end of the valve guide is further provided with oppositely disposed axially extended recesses in its outer periphery and intersecting with the annular recess, to facilitate recessing of said connecting links.

6. The improved valve apparatus as defined in claim 1, wherein the valve seat is formed of a non-metallic, slightly deformable plastic material which serves as its own packing to provide a fluid tight seal when the valve is in the closed condition.

7. The improved valve apparatus as defined in claim 1 wherein the interior wall of the valve body within which the inner annular port is formed is provided with an annular vertically recessed seat coaxially with said port and complementally formed to receive said annular valve seat therein and to preclude lateral displacement of the valve seat away from the valve port.

8. The improved valve apparatus as defined in claim 7 wherein the valve seat is formed of a relatively rigid non-metallic material and an annular resilient packing ring is disposed within said vertical annular recess adjacent said port, and against which the valve seat co-acts to provide a fluid-tight seal when the valve is in the closed condition.

References Cited

UNITED STATES PATENTS

| | | | |
|---|---|---|---|
| 647,192 | 4/1900 | Lunken | 251—362 |
| 1,493,784 | 5/1924 | Larson | 251—363 |
| 2,599,498 | 6/1952 | Suska | 251—362 XR |
| 2,692,750 | 10/1954 | Davis et al. | 251—362 XR |
| 2,845,085 | 7/1958 | Robbins | 251—362 XR |
| 3,228,655 | 1/1966 | Weise | 251—362 |
| 3,250,510 | 5/1966 | Williams | 251—363 XR |

FOREIGN PATENTS 24,189   1912   Great Britain.

SAMUEL SCOTT, *Primary Examiner.*

U.S. Cl. X.R.

251—362